Oct. 30, 1945.　　　　W. E. WILLIAMS　　　　2,387,789
OPHTHALMIC MOUNTINGS, MORE PARTICULARLY LENSES
FOR MOUNTINGS, AND METHODS OF MAKING THE SAME
Filed May 27, 1942
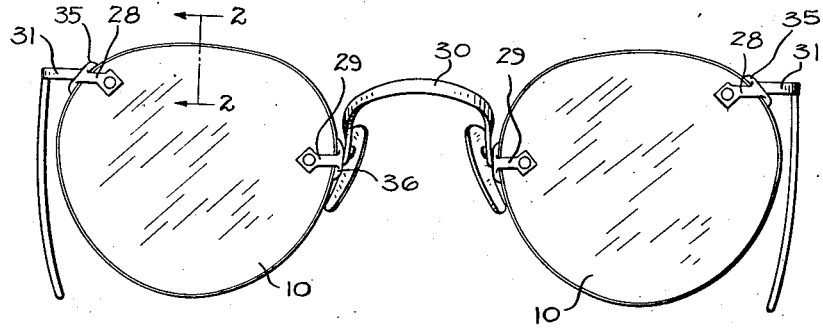
Fig. 1
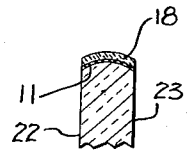 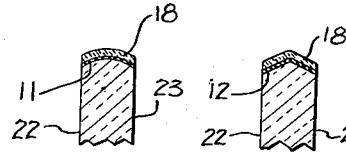 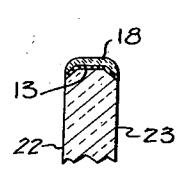 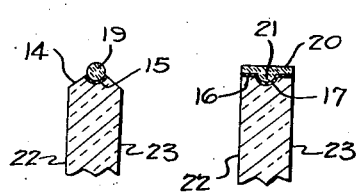
Fig. 2　Fig. 3　Fig. 4　Fig. 5　Fig. 6
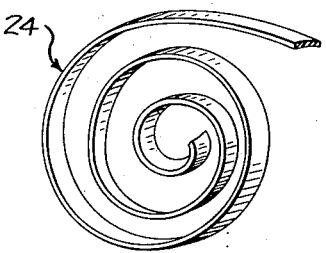 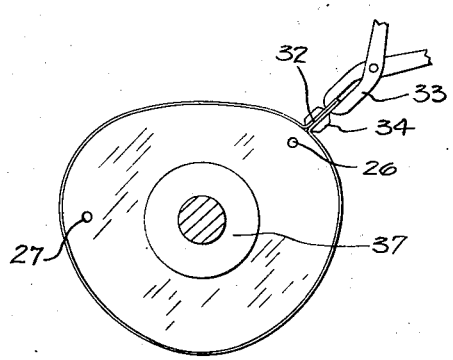
Fig. 7
Fig. 8
Fig. 9
INVENTOR
WILLIAM EWART WILLIAMS
BY Louis L. Gagnon
ATTORNEY Patented Oct. 30, 1945

2,387,789

UNITED STATES PATENT OFFICE 2,387,789

OPHTHALMIC MOUNTING, MORE PARTICULARLY LENS FOR MOUNTINGS, AND METHOD OF MAKING THE SAME

William Ewart Williams, Pasadena, Calif.

Application May 27, 1942, Serial No. 444,618

7 Claims. (Cl. 88—54)

This invention relates to improvements in ophthalmic mountings and has particular reference to novel means and method of providing lenses with a protective rim about the contour edges thereof for rendering them more resistant to impact.

One of the principal objects of the invention is to provide a relatively thin protective band about the contour edges of rimless lenses while still retaining the advantages, aesthetically or otherwise, of said rimless glasses and method of obtaining said result.

Another object is to provide a substantially invisible band of plastic material about the contour edges of lenses of a rimless type for increasing the resistance of said lenses to impact and also provide protective means against chipping should the lenses be struck at the edges under ordinary daily use and which, in instances when the lenses might become broken, prevent particles from being dispersed with the danger of possible injury to the individual wearing said lenses.

Another object is to provide novel methods of securing such protective bands about the contour edges of the lenses.

Another object is to select materials for use in forming and securing protective bands about the contour edges of lenses having substantially the same indices of refraction as the material of the lenses whereby the band and cement or other means by which the band is secured to the lens will be substantially invisible thereby retaining the desired rimless lens appearance.

Another object is to provide a lens with a protective band of material substantially the same color as the material of the lens with said band preferably being of the same index of refraction as the material of the lens.

Other objects and advantages of the invention will become apparent from the following description taken in connection with the accompanying drawing and it will be apparent that many changes may be made in the details of construction, arrangement of parts and methods shown and described without departing from the spirit of the invention as expressed in the accompanying claims. I, therefore, do not wish to be limited to the exact details of construction, arrangement of parts and methods shown and described as the preferred forms only have been given by way of illustration.

Referring to the drawing:

Fig. 1 is a front elevation of a mounting having lenses embodying the invention;

Figs. 2 through 6 are fragmentary sectional views illustrating different modified constructions of the invention;

Fig. 7 is a perspective view of a strip of material used in forming the band about the lens;

Fig. 8 is a view illustrating a step of the process of manufacture and further illustrating the placing of the band about the contour of the lens; and Fig. 9 is a fragmentary perspective view of a strip of material illustrating another step in the process of manufacture.

Some attempts have been made, in the past, to provide a band about the contour edges of lenses for setting up a compression strain on said lenses to increase their resistance to impact. Such bands have in the past been usually of a relatively heavy metal which, because of their appearance, rendered the use of such lenses and bands impractical in forming ophthalmic mountings.

Another difficulty with rimless type lenses under ordinary conditions of use is that the edges would often become chipped through striking said edges, for example, on a hard surface or the like.

The present invention, therefore, is directed particularly to overcoming the above difficulties through the provision of a band of transparent plastic material secured to the contour edges of the lenses in such a manner as to cause the lens to be resistant to impact and protect the contour edges of the lenses against accidental chipping and at the same time be substantially invisible to retain all of the advantages, aesthetically or otherwise, of the rimless glasses.

Referring more particularly to the drawing wherein like characters of reference designate like parts throughout the several views the lenses 10 are first formed to the contour shape and size desired; it being understood, of course, that the desired opposed optical surfaces have previously been formed on the lens. The shape of the edge of the lens, which might be any one of those illustrated in Figs. 2 to 6 inclusive or any other desirable shape, is formed during the reducing of said lens to the desired contour shape and size.

In Fig. 2 the edge 11 of the lens is formed with an outward continuous curve. The edge 12 of the lens, in Fig. 3, has a V-shaped bevel. The edge 13 of the lens of Fig. 4 has a central flat area with opposed bevelled edges. The edge 14 of the lens of Fig. 5 has opposed bevels with the apex of the bevels provided with a circumferential channel 15. The edge 16 of the lens of Fig. 6 is flat and has a circumferential groove 17 therein. With lenses of the type illustrated in Figs. 2 to 4 inclusive, it is to be understood that the band 18 is initially shaped substantially to the shape of the edge. In Fig. 5 the band 19 may have a circular cross-section or may have a semi-circular cross-section with the under surface shaped to fit within the circumferential groove 15.

In the construction illustrated in Fig. 6 the band 20 has a central bead 21 shaped to fit within the circumferential groove 17 with the remainder of the band on the opposed sides of the bead shaped to fit substantially the flat edge surface of the lens. The opposed side surfaces 22 and 23 of the lenses are initially provided with optical surfaces of proper curvature to introduce the prescriptive characteristics desired of the lens. The bands 18, 19 or 20, as the case may be, are in the form of a relatively continuous strip or coil 24, such as shown in Fig. 7, with the coil of course having the proper cross-sectional shape to fit the edges of the respective lenses. The band is formed of a material such as nylon or vinyl which is transparent and has substantially the same index of refraction as the glass material of the lens which, in the present instance, is a commercial crown glass such as is ordinarily used in forming ophthalmic lenses.

It is to be understood, however, that if the lenses are formed of a glass of a different index of refraction the index of refraction of the material of the band will be controlled to be substantially similar to that of the glass. In preparing to secure the band to the contour edges of the lenses, as diagrammatically illustrated in Figs. 8 and 9, a piece of the band of the proper length to be fitted about the contour edge of the lenses, as illustrated in Fig. 9, is first cut from the coil 24. The under surface of the band, as illustrated at 25, is provided with a coating of a suitable transparent vinyl cement, such as made by The Carbon and Carbide Chemical Corporation. The band initially is of a length considerably shorter than the circumference of the lens and is initially grasped adjacent the ends by a suitable tool, for example, pliers, by means of which the band may be fitted and drawn about the contour edge of the lens under a very high tension until the ends of said band meet, as illustrated in Fig. 8. It is to be understood that the lens is initially provided with the suitable connection openings 26 and 27 whereby the lens straps 28 and 29 may be connected with the lens. This is to attach the bridge 30 and temple supports 31 to the lenses. The lens straps 28 and 29, the bridge 30 and the temple supports 31, may be of any the usual prior art type. In drawing the band 18, 19 or 20, as the case may be about the contour edge of the lens the said band is preferably initially positioned on the lens so as to cause the meeting ends 32 to be positioned adjacent one of the connection openings in the lens or to be located adjacent the drill position at which the connection opening is to thereafter be formed in the lens, it being understood that the connection openings may be formed in the lens either before or after the band has been secured thereto. In drawing the band about the contour edge of the lens under the relatively high tension the adhesive or cement is compressed between the edge of the lens and the under surface of the band and the band is held in said relation with the lens until the cement or adhesive is allowed to solidify. This can be accomplished by a suitable jig or by the use of pliers 33 and 34. The pliers 33 are used to initially pull the band about the lens with the jaws of the pliers 34 being adapted to draw the band adjacent the lens into intimately fitted relation adjacent the lens and cause the cement on said lens to firmly secure the ends together. After the cement has been allowed to solidify the protruding portions of the band may be removed as by cutting, filing or other means. Any suitable clamp means or other holding device 37 may be used for holding the lens during the positioning of the band thereon.

To cause the cement to solidify more readily the lens as in Fig. 8 having the band drawn tightly about its contour edge may be placed in a suitable oven and heated until the cement is properly solidified. This causes the band to exert a compression on the glass to render said lens more resistant to impact and to simultaneously provide a protective plastic coating about the edge of the lens to reduce the tendency of the edge to chip during the use of the lens and to also serve as means for prevening particles of glass from being dispersed if the lens is accidentally broken.

Because of the fact that the cement or adhesive used and the nylon or vinyl band used have substantially the same index of refraction as the glass the said band will be substantially invisible when properly mounted on the lens. It is to be understood that after the band has been secured in position the said band may require some slight trimming throughout the contour of the lens and undesirable blemishes or protrusions may be removed by cutting, filing, buffing or the like.

The edge coatings or bands, when the lens straps are secured to the lenses, also function as cushion means for the edge engaging portions 35 and 36 of the lens straps and aid in preventing said lens straps from chipping the edge of the lenses during the use of the mounting. It is to be understood that instead of using lens straps for securing the bridge and temple supports to the lenses ordinary continuous lens rims might be used in which instance the lens rims will be cushioned from the edges of the lenses by means of the band.

In securing the bands to the contour edges of the lenses the initial length of the band is such as to require a pull of a very high tension in order to draw the ends together. This is to introduce the proper compression action on the lens. It has been found that the initial length of the band should not exceed approximately ⅔ of the circumference of the lens. One procedure in securing the band to the contour edge of the lens is to initially place the transparent cement in the groove or under surface of the band. The band is then fitted about the contour edge of the lens with its length being substantially two-thirds that of the circumference of the lens. The ends of the band are then gripped by suitable pliers 33 or the like and the ends of said band are pulled towards each other until the said ends engage with each other with portions adjacent the ends turned outwardly and engaging in side surface relation with each other as illustrated in Fig. 8. In following this latter procedure the band may be preheated and stretched or the band may be heated during said stretching, in which instance, the stretching operation would be performed before the cement or adhesive solidifies. Nylon or vinyl has a much higher temperature coefficient of expansion than glass. However, it is under such a high tension when in position on the lens that even though the glass and band might be heated, which under normal conditions one would assume would cause the nylon or plastic band to become loose, the high tension under which the band is placed is sufficient to overcome the variations in expansion factors between the nylon, vinyl, or other similar plastic material and the glass.

The band of desired initial shape may be formed by extrusion and in each instance, preferably formed to a cross-sectional shape to fit properly with the contour edge of the lens to which it is to be attached.

Although nylon and vinyl have been set forth as materials from which the band is formed, it is to be understood that it may be formed of any suitable transparent material having the characteristics desired.

From the foregoing description it will be seen that simple, efficient and economical means and methods have been provided for accomplishing all of the objects and advantages of the invention.

Having described my invention, I claim:

1. The method of forming a lens with edge protective means comprising shaping said lens to the contour shape and size desired, stretching a band of non-frangible plastic material of a length less than the circumference of the lens about the contour edge of said lens to an extent sufficient to cause the ends of the band to meet and the said band to be under tension and securing said band on said lens while under tension.

2. The method of forming a lens with edge protective means comprising shaping said lens to the contour shape and size desired, placing a transparent adhesive on a section of transparent non-frangible band material, of a length less than the circumference of the lens, said adhesive and band material having substantially the same index of refraction as the material of the lens, drawing said band under tension about the contour edge of the lens to stretch said band an amount sufficient to draw the ends thereof together with the adhesive lying between said band and the edge of the lens and allowing said adhesive to set to secure said band to said lens in this relation.

3. The method of reinforcing a lens comprising shaping the lens to the contour shape and size desired, cutting a strip of transparent band material to a length considerably less than the circumferential dimension of the lens, placing an adhesive on the surface of said band which is to engage the edge of the lens, fitting the band about said edge, grasping the ends of the band and drawing said ends together to place said band under tension about the contour of the lens and retaining the lens and band in said relation until the adhesive solidifies and retains the band in fitted relation with the lens.

4. A lens having a circumferential edge of a given controlled contour shape and having cushion-like protective means surrounding said edge, said cushion-like protective means being in the form of a circumferential band of ribbon-like non-frangible plastic material overlying and surrounding said edge and self-conforming to the shape of said edge, said ribbon-like plastic material being of a width no greater than the width of the edge of the lens and being secured under tension about said contour edge.

5. A lens having a circumferential edge of a given controlled contour shape and having cushion-like protective means surrounding said edge, said cushion-like protective means being in the form of a circumferential band of ribbon-like non-frangible plastic material overlying and surrounding said edge and self-conforming to the shape of said edge, said ribbon-like plastic material being of a width no greater than the width of the edge of the lens and being adhesively secured under tension about the said contour edge and being adhesively secured to the surface of said edge.

6. A lens having a circumferential edge of a given controlled contour shape and having cushion-like protective means surrounding said edge, said cushion-like protective means being in the form of a circumferential band of ribbon-like non-frangible plastic material overlying and surrounding said edge and self-conforming to the shape of said edge, said ribbon-like plastic material being of substantially the same width as the width of the edge of the lens and being adhesively secured under tension about said edge with its meeting ends adhesively secured to each other and with said band being adhesively secured to the surface of said edge, the plastic material and said adhesive being of substantially the same index of refraction as the material of the lens.

7. The method of forming a lens with edge protective means comprising shaping said lens to the contour shape and size desired, stretching a band of non-frangible plastic material of a length sufficient to be positioned about the contour edge of said lens to an extent sufficient to cause the ends of said band to meet and the said band to be under tension and securing said band on said lens while held under tension.

WILLIAM EWART WILLIAMS.